June 4, 1968  W. S. OSTRANDER  3,386,499

HEATING AND COOLING SYSTEM

Filed July 8, 1965  2 Sheets-Sheet 1

INVENTOR.
WILLIAM S. OSTRANDER.

BY Robert F. Buemeli

ATTORNEY.

United States Patent Office 3,386,499
Patented June 4, 1968

3,386,499
HEATING AND COOLING SYSTEM
William S. Ostrander, Fayetteville, N.Y., assignor to Carrier Corporation, Syracuse, N.Y., a corporation of Delaware
Filed July 8, 1965, Ser. No. 470,496
5 Claims. (Cl. 165—29)

This invention relates to heating and cooling systems of the kind used in an air conditioning installation and, more particularly, to such a system having a first refrigeration machine utilizing heat acquired in its operation, in the satisfaction of a heating requirement imposed upon the enclosure served by the system, and a second refrigeration machine for supplementing the cooling provided by the first machine together with suitable controls enabling the system to satisfy any combination of simultaneous heating and cooling demands imposed on the enclosure.

In electric heat pump air conditioning systems, it is often difficult to arrange refrigeration machines for providing both adequate heating and adequate cooling economically. In general, reciprocating refrigerating machines and high lift centrifugal machines can be satisfactorily operated at a sufficiently high refrigerant condensing temperature to provide the desired hot water temperature for heating, but the power input to these machines while producing relatively high water temperatures for heating is substantially greater than that required for producing refrigeration under normal condensing temperatures. Furthermore, in the majority of commercial applications, the cooling requirements are much larger than the heating requirements and the operation of the system at elevated temperatures to satisfy the heating requirements imposes a substantial operating cost penalty upon the cooling operation.

It is a primary object of this invention to provide a new and improved air conditioning system incorporating a unique arrangement of refrigeration equipment. A related object is to provide such a system which will produce relatively high heating water temperatures more economically than systems now in use and, more particularly, where the cooling load is at least twice as large as the heating load, and wherein the system is of greater benefit as this cooling and heating capacity ratio increases.

Another object is to provide a new and improved air conditioning system including first and second refrigeration machines for cooling a load and rejecting the heat evolved therein, the first refrigeration machine rejecting the heat at a relatively high refrigerant condensing temperature sufficient to provide adequate hot water for heating, and regulating the cooling capacity of the first machine to provide adequate hot condensing water for satisfying the heating demand and operating the second machine at cooling capacity sufficient for satisfying the cooling demand not satisfied by the first machine.

These and other objects of the invention will be apparent from the following description and drawing in which.

Figure 1:
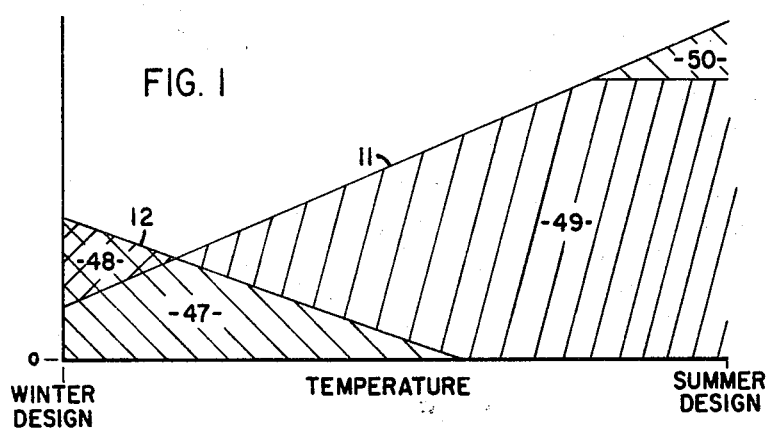
FIGURE 1 is a diagram illustrating heating and cooling loads in a typical installation.

FIGURE 1 is a graph of outdoor temperature against a typical heating and cooling load in a building. The cooling load is indicated by a line 11, and the heating load is indicated by a line 12. Summer design conditions are coincident with the 100% cooling load point, and winter design conditions are coincident with the 100% heating load point. The extreme left end of the cooling line 11 indicates that a substantial cooling load generally exists due to the presence of people and lights in the interior spaces of buildings even when the outside temperature is at winter design conditions, although the peripheral spaces of the building require heating due to heat transmission losses and normal infiltration of low temperature outdoor air. The portion of the cooling line 11 past the right end of the heating line 12, illustrates a typical condition when the outside temperature has risen sufficiently that only cooling is required. In the past, difficulty has been encountered in utilizing packaged refrigeration machines for economically satisfying such heating and cooling demand in a small structure. This problem has been effectively solved by the system forming this invention and illustrated in FIGURE 2.

Figure 2:
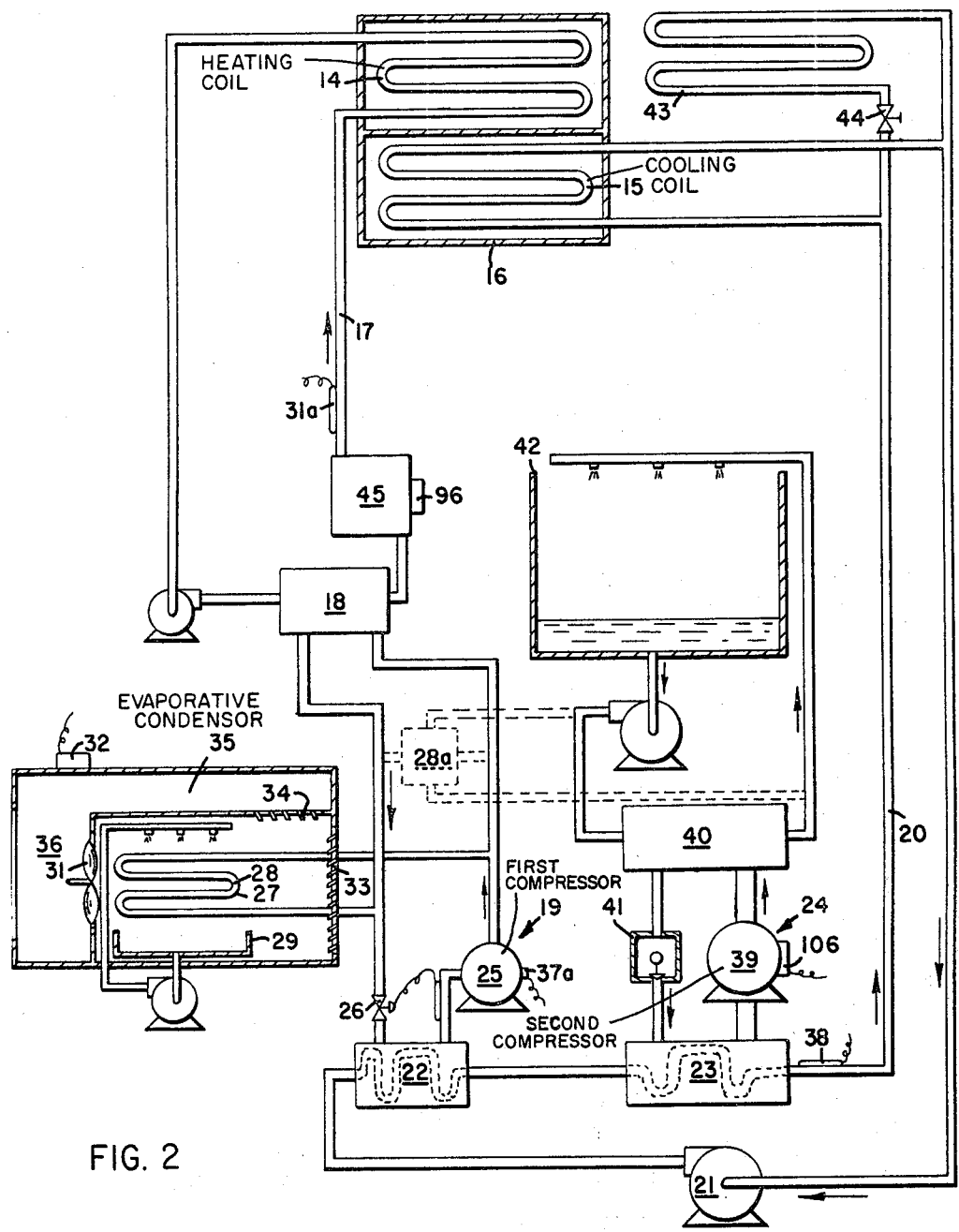
FIGURE 2 is a schematic diagram of a preferred embodiment of the invention.

Referring to FIGURE 2, air to be heated passes over a hot water coil 14, and air to be cooled passes over a chilled water coil 15 within a duct 16, here illustrated in the form of a multi-zone or double duct air distribution system of a kind employed generally in buildings of the type under consideration here. Hot water for the heating coil 14 is provided through a hot water line 17 by water heated as it extracts the heat of condensation from refrigerant in condenser 18 of a first refrigeration machine 19 such as a high lift centrifugal machine or as, preferably, a reciprocating refrigeration machine. Chilled water for the cooling coil 15 is provided through a chilled water circuit including line 20, a chilled water pump 21, and an evaporator 22 of the reciprocating machine 19 in series with an evaporator 23 of a second refrigeration machine illustrated in the form of a centrifugal refrigerating machine 24.

The reciprocating refrigerating machine 19 includes a reciprocating compressor 25 which withdraws refrigerant vapor from the evaporator 22 and passes hot compressed refrigerant vapor to the first condenser 18 from which refrigerant condensate flows through a suitable flow metering device 26 back to the evaporator 22 for chilling water passing through a chilled water bundle in the evaporator and forming part of the chilled water circuit described above. A second refrigerant condenser of the reciprocating machine 19 is illustrated in the form of an evaporative condenser 27 including a refrigerant coil 28 in parallel with the refrigerant circuit of the first condenser 18. If a high lift centrifugal compressor is provided in lieu of the reciprocating compressor 27, a water cooled condenser 28a (phantom lines) may be provided in lieu of the evaporative condenser. Water circulated from a sump 29 by a water pump 30 is sprayed over the refrigerant coil 28 while air from a fan 31 passes across the coil, as is conventional in evaporative condensers to condense the refrigerant. The condensing rate of the condenser 27 or 28a and thus the temperature of the water flowing in line 17 is controlled in any suitable manner as by a thermostat bulb 31a sensing the temperature of hot water in the hot water line 17 and in the case of the evaporative condenser 27 thereby regulating the temperature of the air circulated over the coil 28, for example, by means of a thermostat responsive actuator 32 which regulates suitable adjustable outlet louvers, as 33, and bypass louvers, as 34, in an air recirculating duct 35 to the fan inlet 36.

The quantity of heat provided by the first condenser 18 for heating the air passing across the heating coil 14 is regulated by regulating the output of the reciprocating compressor 25 and the condensing capacity of a heat transfer fluid such as the evaporative condenser 27 as described above. As the cooling capacity increases, the temperature of the refrigerant vapor passed to the first condenser increases so that the condensing or heating water temperature also increases. The thermostat 31a on the hot water line 17 from the first condenser 18 to the heating coil 14 operates an actuator 37a which regulates an unloader of the reciprocating compressor 25 and in sequence regulates the condensing capacity of the evaporative condenser 27 through its control actuator 32. Should additional cooling capacity be required of the reciprocating machine 19 in addition to that required to provide adequate heat for the heating coil 14, a sensor 38 is provided on the leaving branch of the chilled water line 20 downstream of the centrifugal machine evaporator 23 and through the control system overrides the heating demand as sensed by the thermostat bulb 31a.

During heating operation, the centrifugal refrigeration machine 24 picks up any portion of the cooling demand not satisfied by the reciprocating machine 19. As illustrated, the centrifugal refrigerating machine 24 includes a centrifugal compressor 39 which passes compressed refrigerant to a suitable condenser 40 from which the condensate flows through suitable flow metering device 41 to the evaporator 23 for cooling a chilled water bundle of the chilled water line 20, and refrigerant vapor returns to the compressor 39. The centrifugal machine 24 is controlled in any suitable manner, as described later, through the sensor 38, which regulates the output of the centrifugal compressor 39. Heat of the condensing water from the condenser 40 is rejected through a cooling tower 42 or other suitable means. The water cooled condenser 28a of the high lift centrifugal machine may be cooled in any suitable manner as with water from the tower 42.

Should additional heat be required to satisfy the heating load, various expedients serving as a heat source may be employed such as an exhaust heat recovery unit 43 connected in the chilled water line 20 through a valve 44 for regulating the heat picked up by this unit. If still more heat is required, an auxiliary heater, such as an electric resistance heater 45, may be provided in the hot water line 17 between the condenser 18 of the reciprocating machine 19 and the heating coil 14. The heat regulating thermostat 31a is preferably upstream of the auxiliary heater 45 and should the reciprocating refrigerating machine 19 be incapable of providing adequate heat, the thermostat 31a turns on the auxiliary heater 45.

Referring to FIGURE 1, when heating is required, both the reciprocating refrigerating machine 19 and the centrifugal refrigerating machine 24 may be in operation. The thermostat 31a adjusts the unloaders of the reciprocating compressor 25 to increase its pumping capacity and the louvers of the evaporative condenser 27 so that the cooling capacity 47 of the reciprocating machine is sufficient to provide at least enough heat to satisfy the heating demand. If additional heating capacity 48 is required, the exhaust recovery unit 43 and then the auxiliary heater 45 are brought into operation. When additional cooling capacity 49 is required, the centrifugal refrigeraing machine 24 is operated so that the leaving chilled water temperature as sensed by the chilled water sensor 38, is adequate to satisfy the cooling demand. As the heating load drops off and the cooling load continues to increase, the reciprocating machine 19 will cease operation (at the right end of the heating line 12), and the centrifugal machine 24 will carry the load. When the centrifugal machine capacity is exceeded, the reciprocating machine 19 will operate to the extent necessary to satisfy the cooling capacity 50 beyond the capacity 49 of the centrifugal machine 24 by rejecting its heat to the evaporative condenser exclusively.

Figure 3:
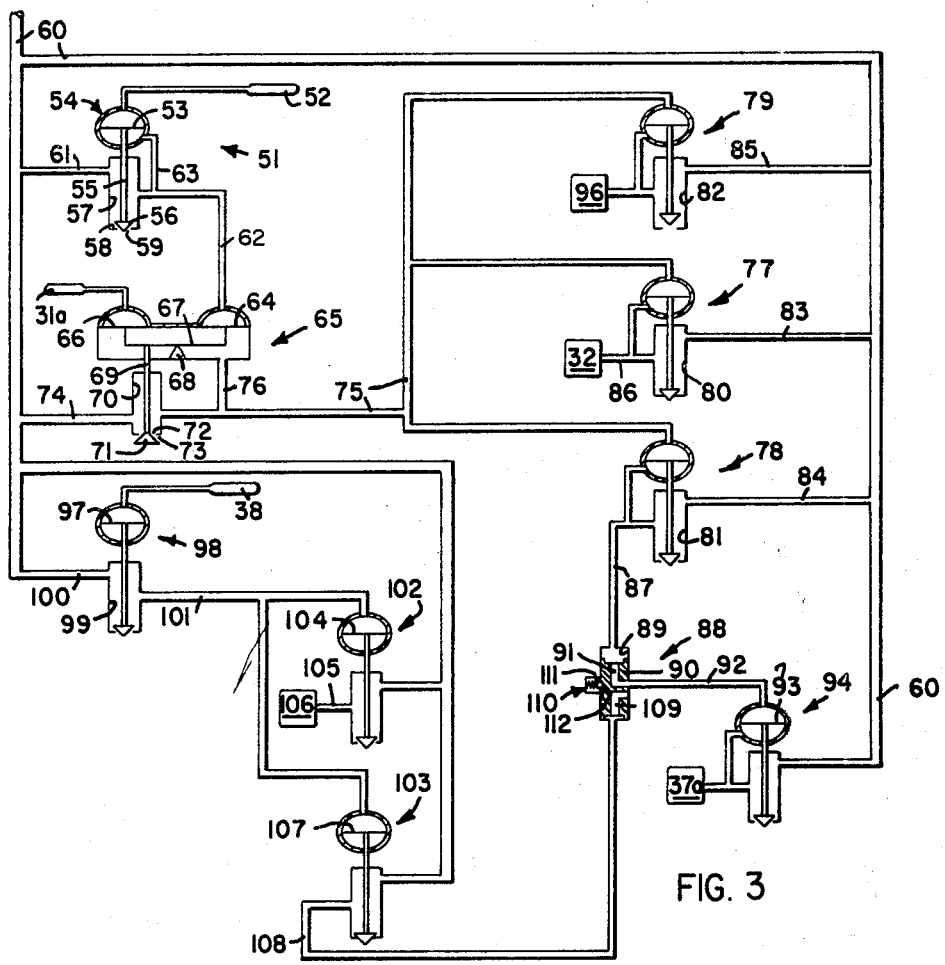
FIGURE 3 is a diagram of a control circuit enabling the system to satisfy the variety of heating and cooling requirements imposed on the installation.

A pneumatic control system for the air conditioning system is illustrated in FIGURE 3. As shown, an outside air thermostat 51 includes a pneumatic temperature sensor bulb 52 exposed to outside air temperature and connected with a diaphragm actuator 53 of a direct acting proportioning relay 54. The diaphragm 53 is connected to one end of a valve stem 55 carrying a valve 56 at its other end. The valve 56 is within an air cylinder 57 and is associated with a valve seat 58 about a port which provides an atmospheric bleed 59. Responsive to an increase in pressure from the bulb 52, the diaphragm 53 is moved downwardly to move the valve 56 in the cylinder 57 toward closed position on the seat 58. Compressed air from a supply main 60 enters the cylinder 57 through a submain line 61 and leaves the cylinder through the bleed 59, if open, and a branch line 62. An equalizer line 63 connects the branch line 62 and the diaphragm actuator 54 on a side of the diaphragm 53 opposite the connection from the bulb 52. The branch line 62 is connected with a pneumatic diaphragm actuator 64 of a submaster thermostat 65. The pressure in the branch line 62 is the same as in the supply main 60 when the valve 56 is closed and progressively decreases as the valve moves to full open position to bleed increasing amounts of air from the cylinder 57.

The submaster thermostat 65 is a reverse acting, resetting type and, in addition to the pneumatic diaphragm actuator 64 connected through the branch line 62 of the outside thermostat, includes a second pneumatic diaphragm actuator 66 connected with the temperature sensor bulb 31a associated with the hot water line 17 to the heating coil 14. A suitable linkage such as a lever 67 having opposite ends, one connected with each diaphragm actuator 64 and 66, and fulcrumed at 68 intermediate its ends, is connected with a valve stem 69 between the fulcrum and the end connected with the second diaphragm 66. The stem 69 extends through a cylinder 70 and carries a valve 71 outside the cylinder. As the temperature of the hot water in the hot water line 17 increases, the valve 71 moves from its seat 72 about an air bleed port 73 toward full open position thus permitting more air to bleed from the cylinder which is connected through a submain line 74 with the compressed air supplied the main 60, thus modulating the air pressure in a submaster branch line 75 from the cylinder 70. The submaster thermostat may be reset, for example as follows: as the outside air temperature drops, the outside air thermostat valve 56 will move toward full open position, thus reducing the pressure in the branch line 62 to the submaster thermostat diaphragm 64 causing the lever 67 to pivot counterclockwise, thus moving the submaster valve 71 toward full open position and causing the pressure in the branch line 75 from the submaster to be reduced. An equalizer line 76 connects the branch line 75 and the faces of the diaphragms 64 and 66 opposite their previously mentioned connections.

The submaster thermostat branch line 75 communicates with three direct ratio proportioning pneumatic relays 77, 78 and 79 generally of the same type as that employed in the outside air thermostat 51 and each having a cylinder 80, 81 and 82, respectively, connected with the compressed air supply main 60 by submains 83, 84, and 85, respectively. These three relays include an evaporative condenser damper control relay 77 having its branch line 86 connected with the damper actuator 32 for maintaining the dampers 33 and 34 open at low pressure in the submaster branch line, for example, 3 p.s.i., and modulating the dampers to close position at 6 p.s.i., for example. The second proportioning relay 78 controls the heating capacity of the reciprocating compressor 25 when the reciprocating machine is required to operate at a capacity to satisfy a heating load in excess of its minimum capacity and has its branch line 87 connected with a cumulator relay 88 and, more particularly, one end of a cumulator relay cylinder 89 containing a free piston 90. When the pressure in the branch line 87 is sufficient to position the free piston 90 to the far end of the cylinder 89, the branch line pressure is applied through a passage 91 in the cylinder 90 to a cumulator relay branch line 92 leading to a diaphragm actuator 93 of a reciprocating compressor direct ratio proportioning relay 94 having its branch line 95 connected with the reciprocating compressor control actuator 37a for increasing the capacity of the reciprocating compressor 25 as the branch line pressure increases.

The heating capacity control relay 78 may operate between pressures of 7 and 10 p.s.i. in the submaster branch line 75 to modulate the reciprocating compressor 25 from low capacity at 7 p.s.i. to full capacity at 10 p.s.i. Thus, as the pressure in the submaster branch line 75 increases from 7 to 10 p.s.i., a valve of the relay 78 modulates to closed position, thus increasing the air pressure in its branch line 87 to the cumulator relay 88 and thereby the pressure in the cumulator branch line 92 to the compressor relay 94 to increase the capacity of the reciprocating compressor 25. If still more heating capacity is required, the pressure in the submaster branch line 75 increases and between 11 p.s.i. and 14 p.s.i., the third relay 79 is actuated to operate an actuator 96 associated with auxiliary heat means 45 to modulate the auxiliary heater to full heating capacity at 14 p.s.i.

Cooling capacity control is regulated by the pneumatic temperature responsive sensor bulb 38 on the leaving branch of the chilled water line 20 to operate a pneumatic diaphragm actuator 97 of a direct acting thermostat 98. The thermostat has a cylinder 99 connected by a submain 100 with the compressed air supply main 60, and the pressure applied through its branch line 101 is increased as the chilled water temperature increases. The cooling capacity thermostat branch line 101 is connected with a pair of direct ratio proportioning relays 102 and 103. More particularly, the branch line 101 is connected with a pneumatic diaphragm actuator 104 of a centrifugal compressor capacity control relay 102. The branch line 105 of the capacity control relay 102 is connected with a suitable pneumatic centrifugal compressor capacity control actuator 106 for modulating the capacity of the centrifugal compressor 39 as the pressure applied through the branch line 105 varies, for example, this relay may be operable between 3 and 7 p.s.i. to provide full centrifugal compressor capacity at 7 p.s.i. The thermostat branch line 101 is also connected with a diaphragm actuator 107 of the relay 103 which also controls the reciprocating compressor capacity. The pressure delivered by this relay's branch line 108 to the cumulator relay 88 may increase between 9 and 13 p.s.i., for example. The branch line 108 is connected to the one end of the cumulator relay cylinder 89 opposite the branch line 87 from the reciprocating compressor capacity control relay 78 of the heating control system.

When the pressure from the cooling capacity control relay 103 exceeds the pressure from the heating capacity control relay 78, the free piston 90 moves to the upper end of the cylinder, so that the air pressure from the cooling control relay 103 is applied through a passage 109 in the free piston 90 for regulating the reciprocating machine capacity control relay 94. An overcenter device 110 in the form of a spring press detent 111 is provided the cumulator relay 88 so that the free piston 90 is always at one end or the other of the cylinder 89 and only one passage 91 or 109 communicates with the branch line 92. The detent is always seated in one of two sockets 112 in the free piston 90 and the differential in pressure between the ends of the cylinder must be sufficient to overcome the holding action of the detent 111 in order to move the piston 90 to the opposite end of cylinder 89.

While a preferred embodiment of the invention has been described and illustrated, it should be understood that the invention is not limited thereto but may be otherwise embodied within the scope of the following claims.

I claim:

1. A heating and cooling system comprising a pair of refrigeration machines for cooling a load and including a centrifugal refrigeration machine operable at a relatively low refrigerent condensing temperature and a reciprocating refrigeration machine having unloaders providing stepped cooling capacity control, the last said machine having a first refrigerant condenser and an evaporative refrigerant condenser for operation at a relatively high condensing temperature, means for passing the heat rejected by said reciprocating machine condenser to a load to be heated, means connecting said evaporative condenser in circuit with said first condenser for regulating the tempertaure and quantity of heat rejected by said first condenser, said centrifugal refrigeration machine and said reciprocating refrigeration machine each having an evaporator with a chilled water circuit, means connecting the chilled water circuit in series, the reciprocating machine upstream of the centrifugal machine, for operation of said reciprocating machine up to its normal full cooling capacity to provide heat sufficient to heat the load to be heated before said centrifugal machine is effective for cooling the load to be cooled, and means for regulating the condensing capacity of said evaporative condenser responsive to the quantity of heat required by said load to be heated.

2. Heating and cooling apparatus including first and second refrigeration machines, a first heat transfer fluid, a first circuit for the flow of the first heat transfer fluid, the circuit including the evaporators of the two refrigeration machines to provide relatively low temperature fluid, a second heat transfer fluid, a second circuit for the flow of the second heat transfer fluid, the second circuit including the condenser of the first refrigeration machine to provide relatively high temperature fluid, additional condensing means associated with the first refrigeration machine, and system control means regulating said additional condensing means to govern the condensing temperature of the first refrigeration machine and thereby regulate the temperature of the relatively high temperature fluid.

3. Heating and cooling apparatus as described in claim 1 wherein said first refrigeration machine includes capacity control means and said system control means includes mechanism for varying the capacity of said capacity control means to regulate the capacity of the first machine in response to either a heating requirement or a cooling requirement.

4. Heating and cooling apparatus as described in claim 3 wherein said system control means includes mechanism for automatically energizing the second refrigeration machine in response to a predetermined cooling requirement.

5. Heating and cooling apparatus including first and second refrigeration machines, a first heat transfer fluid, a first circuit for the flow of the first transfer fluid, the circuit including the evaporators of the two refrigeration machines to provide relatively low temperature fluid, a second heat transfer fluid, a second circuit for the flow of the second heat transfer fluid, the second circuit including the condenser of thte first refrigeration machine to provide relatively high temperature fluid, additional condensing means associated with the first refrigeration machine, and system control means operable to energize the first machine to provide simultaneous flow of relatively warm and relatively cold fluids in the respective fluid circuits, said system control means being furhter operable to either selectively or additionally energize the second refrigeration machine to increase the cooling capacity of the apparatus, to activate or deactivate the additional condensing means associated with the first machine to vary the heating capacity and to regulate the capacity of at least one of the refrigeration machines to satisfy a plurality of simultaneous heating and cooling requirements.

References Cited

UNITED STATES PATENTS

| | | | |
|---|---|---|---|
| 2,935,857 | 5/1960 | McFarlan | 165—29 X |
| 3,067,587 | 12/1962 | McFarlan | 62—159 |
| 3,234,749 | 2/1966 | Quick | 62—510 X |
| 3,267,689 | 8/1966 | Liebert | 62—277 |

ROBERT A. O'LEARY, *Primary Examiner.*

CHARLES SUKALO, MEYER PERLIN, *Examiners.*

W. E. WAYNER, *Assistant Examiner.*

UNITED STATES PATENT OFFICE
CERTIFICATE OF CORRECTION

Patent No. 3,386,499                                        June 4, 1968

William S. Ostrander

It is certified that error appears in the above identified patent and that said Letters Patent are hereby corrected as shown below:

Column 2, line 39, after "chilling" insert -- a heat transfer fluid such as --; line 56, after "of" insert -- a heat transfer fluid such as --; lines 67 and 68, cancel "a heat transfer fluid such as". Column 5, line 42, cancel "one". Column 6, line 45, after "first", second occurrence, insert -- heat --; line 50, "thte" should read -- the --; line 56, "furhter" should read -- further --.

Signed and sealed this 3rd day of February 1970.

(SEAL)
Attest:

Edward M. Fletcher, Jr.                          WILLIAM E. SCHUYLER, JR.
Attesting Officer                                      Commissioner of Patents